Patented May 7, 1940

2,200,220

UNITED STATES PATENT OFFICE 2,200,220

N-SUBSTITUTED ASPARTIC ACIDS AND THEIR FUNCTIONAL DERIVATIVES AND PROCESS OF PRODUCING THEM

Walter Reppe and Hanns Ufer, Ludwigshafen-on-the-Rhine, Germany, assignors to I. G. Farbenindustrie Aktiengesellschaft, Frankfort-on-the-Main, Germany No Drawing. Application June 3, 1937, Serial No. 146,202. In Germany June 6, 1936

8 Claims. (Cl. 260—534)

The present invention relates to N-substituted aspartic acids and their functional derivatives and a process of producing them.

We have found that N-substituted aspartic acid substances (i. e., N-substituted aspartic acids or their functional derivatives) can be prepared in a very advantageous manner by treating free maleic acid (which may also be employed in the form of its anhydride) for a long time at an elevated temperature with an organic compound containing at least one group —NHX (wherein X stands for a hydrogen atom or an alkylol group), such proportions being employed that per each molecule of maleic acid at least one group —NHX is present, the resulting reaction products being saponified if necessary. For example with one molecular proportion of maleic acid there may be reacted at least about two molecular proportions of an organic compound containing one primary amino group or one secondary amino group substituted by an alkylol group or at least about one molecular proportion of an organic compound containing two primary amino groups or secondary amino groups substituted by alkylol groups. In this manner there are formed from the maleic acids and the primary amines in a very smooth reaction the corresponding aspartic acid anils:

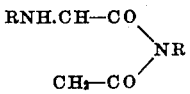

By treatment with saponifying agents, such as alkalies or mineral acids, the N-substituted aspartic acids or their salts are obtained therefrom.

Generally speaking it is advantageous to carry out the reaction in the presence of solvents or suspension agents, as for example especially water, alcohols or ketones or mixtures of the same with water.

In the case of aniline, heating for a long time at from about 80° to 100° C. is usually sufficient. In the case of other primary amines higher temperatures, as for example temperatures of from 100° to about 180° C., are frequently necessary; consequently, when using water or other solvents boiling below the reaction temperature, it is then necessary to work in closed vessels. The saponification of the intermediate product first formed is preferably effected by heating for a long time with alkalies in aqueous or alcoholic solution. High temperatures and working under pressure are also frequently necessary to obtain good yields in this case. The primary amine split off by the saponification may be separated and used again.

For the preparation of N-substituted aspartic acids or their derivatives it is not necessary to isolate the addition compound first formed; on the contrary its preparation and saponification may be effected one after the other in one apparatus. The free N-substituted aspartic acids are generally speaking but slightly soluble in water so that they may be precipitated from aqueous solutions of their salts by the addition of mineral acids.

Organic compounds containing one primary amino group suitable for the said reaction are for example aromatic primary amines, such as aniline and also primary aromatic amines containing more than 6 carbon atoms, for example naphthylamines, aminoanthracenes, aminoanthrachinones, furthermore primary aromatic amines substituted on carbon atoms by alkyl, phenyl, naphthyl, cyclohexyl, alkoxy, hydroxyalkyl, hydroxy, nitro, carboxylic or secondary, tertiary amino or quaternary ammonium groups or halogen atoms, such as toluidines, xylidines, C-ethylanilines, C-phenylanilines, C-cyclohexylanilines, C-phenylnaphthylamines, aminobenzylnaphthalenes and chloro- or bromo-anilines, or the corresponding derivatives of polynuclear aromatic amines. Cycloaliphatic primary amines, such as cyclohexylamine, or aliphatic amines, such as methyl, ethyl, hexyl, or alkyl amines with alkyl groups containing at least 8 carbon atoms such as octyl, dodecyl, octodecyl, or oleyl amine, furthermore monoethanol amine and monopropanol amine, and also aliphatic-aromatic primary amines, such as benzylamine or derivatives of the said amines substituted on carbon atoms, such as aminocarboxylic acids or chloroalkylamines are also suitable. Mixtures of alkyl amines the alkyl radicles of which correspond to the alcohols obtainable by reducing fatty acid mixtures of vegetal origin may also serve as initial components.

As diamines there may be mentioned for example the ortho-, meta- and para-phenylenediamines, benzidines, naphthylene diamines, diaminoanthracenes and their derivatives substituted on carbon atoms.

If, in the reaction of maleic acids with primary diamines, such as phenylene diamines, benzidines and the like, at least 2 molecular proportions of diamine are used for each molecular proportion of maleic acid, preferably only one amino group of each molecule of diamine reacts with the maleic acid so that N-substituted aspartic acids are obtained which still contain a free amino group. Such amino-substituted aspartic acids may be used as diazotisable components for the preparation of azo dyestuffs. They may also be used in many cases as coupling components for the preparation of azo dyestuffs.

When using organic compounds containing one secondary amino group substituted by at least one alkylol group, it is generally speaking preferable to use more than one molecular proportion and advantageously about 3 molecular proportions of the amino compound for each molecular proportion of maleic acid. In this reaction there is apparently first formed from the maleic acid and the secondary amine the maleic acid diamide. This then adds on a third molecule of amine to form the aspartic acid diamide. By treatment with saponifying agents, such as alkalies or mineral acids, the salts of the N-hydroxyethylaspartic acids are then obtained with the re-formation of 2 molecular proportions of secondary amine. The use of water or other solvents or suspension agents is frequently of little advantage in this case.

Suitable organic compounds containing one or more secondary amino groups substituted by alkylol groups are for example diethanol amine and dipropanol amine and also the secondary amines formed from the aforementioned primary amines by the substitution of the hydrogen atom of the primary amino group by an alkylol group, as for example N-monohydroxyethylaniline, N-monohydroxyethyltoluidines, N-monohydroxyethylchloranilines, N-monohydroxyethylnaphthylamines, N-monohydroxyethylaminoanthracenes or N-monohydroxyethylalkylamines, such as N-monohydroxyalkylbutylamine or N-monohydroxyalkyllaurylamine.

The maleic acids may be used as such or in the form of their anhydrides. The resulting N-substituted aspartic acids may be used for example for the preparation of dyestuffs, tanning agents and assistants for the textile and related industries or as intermediate products therefor.

The following examples will further illustrate the nature of this invention but the invention is not restricted to these examples. The parts are by weight.

*Example 1*

930 parts of aniline are added at from 90° to 100° C. to a solution of 500 parts of maleic acid in 2000 parts of water while stirring. The temperature is kept at about 90° C. for about 15 hours. After cooling the N-phenylaspartic acid anil obtained in almost the quantitative yield is filtered off by suction, washed with water and saponified by heating for about 15 hours with 3400 parts of water and 1222 parts of caustic soda solution of 40° Bé. strength. After cooling, the aniline formed by the saponification of the anil is separated and the phenylaspartic acid formed in a very good yield is precipitated from the aqueous solution by the addition of about 850 parts of concentrated hydrochloric acid. The acid may be recrystallized from water for the purpose of purification. Colorless crystals are obtained which melt at from 145° to 147° C.

*Example 2*

480 parts of maleic anhydride, 2000 parts of water and 1070 parts of ortho-toluidine are stirred for about 20 hours at from 90° to 100° C., 1400 parts of caustic soda of 40° Bé. strength are then added and the whole is heated for about 3 hours in a stirring autoclave at 150° C. The ortho-toluidine split off is separated and the resulting ortho-tolylaspartic acid of the formula:

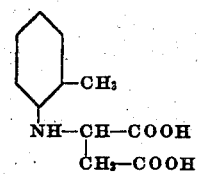

is precipitated from the aqueous solution by the addition of concentrated hydrochloric acid. The ortho-tolylaspartic acid is precipitated as an oil which solidifies to a crystalline mass after a short time. The precipitate is then filtered off by suction, washed with water and may be purified by crystallization from water.

The corresponding aspartic acid derivatives can be obtained from meta- and para-toluidine in an analogous manner. For the preparation of the para-tolyl derivative, a higher temperature (150° C. is necessary for the condensation.

*Example 3*

490 parts of maleic anhydride, 100 parts of water and 1275 parts of para-chloraniline are heated under reflux at 100° C. for 38 hours. 1200 parts of a 50 per cent caustic potash solution are then added and the whole heated in an autoclave at 150° C. for 3 to 4 hours. After cooling, the deposited para-chloraniline is separated and the para-chlorphenylaspartic acid formed is precipitated by acidification of the aqueous solution with mineral acid. The precipitate formed is filtered off by suction, washed with water and dried.

The para-chlorphenylaspartic acid obtained is but slightly soluble in cold water.

*Example 4*

490 parts of maleic anhydride, 1000 parts of water and 1275 parts of meta-chloraniline are heated at 150° C. for 18 hours in a stirring autoclave. The whole is further treated and worked up as described in Example 3. The meta-chlorphenylaspartic acid is obtained in a good yield.

If ortho-chloraniline be used instead of meta-chloraniline, ortho-chlorphenylaspartic acid is obtained.

*Example 5*

822 parts of 2-methoxy-5-methylaniline, 1000 parts of water and 290 parts of maleic anhydride are heated under reflux at about 90° C. for 48 hours in a stirring flask. After cooling, the liquid is decanted from the tough reaction product formed the latter then being heated with 800 parts of water and 600 parts by volume of caustic soda of 40° Bé. strength for about 15 hours at from 80° to 90° C. under reflux while stirring. After cooling, the deposited 2-methoxy-5-methylaniline is separated, the aqueous solution shaken with ether and then fractionally precipitated with hydrochloric acid, the sticky product first obtained being removed. By the further addition of hydrochloric acid there is precipitated the resulting 2-methoxy-5-tolyl-aspartic acid having the formula:

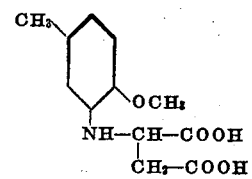

in the form of a white crystalline precipitate.

After filtration by suction and crystallization from alcohol, the compound melts at from 142° to 144° C.

Example 6

870 parts of para-phenylene diamine, 1500 parts of water, and 392 parts of maleic anhydride are heated at from 90° to 100° C. for about 15 hours while stirring. 950 parts of caustic soda solution of 40° Bé. strength are then added and the whole again heated for about 16 hours at about 100° C. After cooling, the precipitated para-phenylene diamine is separated and the compound having the formula:

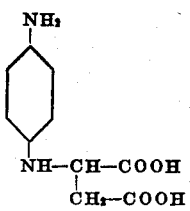

which is formed in a very good yield, is precipitated from the aqueous solution by the addition of hydrochloric acid until slightly acid to congo. The precipitate is filtered off by suction and washed with water. The resulting compound is scarcely soluble in water but readily soluble in alkalies and dilute mineral acids. It may be diazotized and coupled in the usual manner.

Example 7

736 parts of benzidine, 2700 parts of water and 196 parts of maleic anhydride are heated at from 110° to 120° C. in a stirring autoclave for about 14 hours. After cooling, 490 parts of caustic soda of 40° Bé. strength are added and the whole again heated for about 10 hours in the stirring autoclave at the said temperature. After cooling, the deposited benzidine is filtered off by suction and from the aqueous solution the compound of the formula:

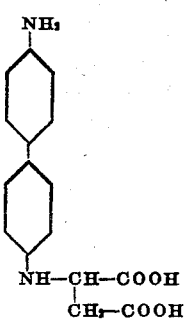

which is formed in a very good yield is precipitated by acidification of the solution until it is slightly acid to congo. Colorless crystals are obtained which are scarcely soluble in water but readily soluble in alkalies and acids.

Example 8

1220 parts of monoethanol amine, 980 parts of maleic anhydride and 1500 parts of water are stirred under reflux at from 95° to 100° C. for about 20 hours. 810 parts of sodium hydroxide in powdered form and 300 parts of water are then added to the solution, the whole then being stirred at the said temperature for another 15 to 20 hours. 4000 parts of alcohol are added to the cooled solution and the oil formed is separated, dissolved in methanol and precipitated by the addition of acetone.

By repeating the dissolution in methanol and precipitation with acetone, a colorless precipitate is obtained which is no longer soluble in methanol and which is boiled with methanol for the purpose of further purification. The resulting crystals, which are scarcely soluble in methanol and acetone but readily soluble in water, constitute the disodium salt of the addition product of 1 molecule of maleic acid to 1 molecule of monoethanol amine and probably have the formula:

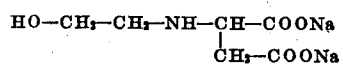

If the corresponding amount of monopropanol amine or of aminodihydroxypropane be used instead of monoethanol amine, the corresponding aspartic acid derivatives are obtained.

In an analogous manner, by heating 500 parts of maleic anhydride, 750 parts of aminoacetic acid in 2000 parts of water and saponifying with 2300 parts of caustic soda solution of 40° Bé. strength and 1000 parts of water, there is obtained the addition product of maleic acid and aminoacetic acid which consists of strongly hygroscopic colorless crystals which are readily soluble in water, glacial acetic acid, glycol and pyridine.

Example 9

730 parts of normal-butylamine, 490 parts of maleic anhydride and 2000 parts of water are stirred for about 25 hours under reflux in a boiling waterbath; 1150 parts of caustic soda solution of 40° Bé. strength are then added and the whole stirred under reflux on a boiling waterbath for a further 23 hours. The resulting solution is evaporated in vacuo until crystallization commences, diluted with such an amount of water that a clear solution is obtained at room temperature and the solution treated with animal charcoal. From the treated solution, the N-butylaspartic acid having the formula:

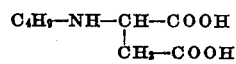

is precipitated by adding concentrated hydrochloric acid until slightly acid to congo. The N-butylaspartic acid is relatively readily soluble in water and very readily soluble in alcohol.

In an analogous manner, the corresponding N-substituted aspartic acids are obtained from other aliphatic amines, as for example dodecylamine, octodecylamine and oleylamine.

Example 10

792 parts of cyclohexylamine, 392 parts of maleic anhydride and 1600 parts of water are heated in a stirring autoclave at 150° C. for about 16 hours. After cooling, 960 parts of caustic soda solution of 40° Bé. strength are added and the whole heated in a stirring autoclave at from 140° to 150° C. for a further 16 hours. After cooling, the deposited oil is separated and the resulting N-substituted aspartic acid precipitated by acidifying the evaporated aqueous solution with hydrochloric acid until it is slightly acid to congo. Colorless crystals are obtained which are slightly soluble in cold water, somewhat more soluble in cold alcohol and readily soluble in hot water and alcohol; they may be purified by recrystallization from water or alcohol. The compound probably has the composition:

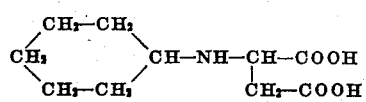

Example 11

1430 parts of beta-naphthylamine, 3500 parts of water, 2000 parts of alcohol and 490 parts of maleic anhydride are stirred under reflux in a boiling waterbath for about 30 hours, 1200 parts of caustic soda solution of 40° Bé. strength being added after stirring for 15 hours.

After cooling, the deposited beta-naphthylamine is separated and the aqueous solution containing the N-substituted aspartic acid formed is evaporated in vacuo. The residue is boiled with alcohol and benzene for the removal of small amounts of beta-naphthylamine still present, then dissolved in a little warm water, treated with animal charcoal and acidified with concentrated hydrochloric acid until just acid to Congo. The deposited crystalline precipitate is filtered off in the cold after allowing to stand for a long period and then washed with water. There is thus obtained N-beta-naphthylaspartic acid having the formula:

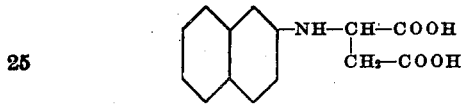

It may be purified by crystallization from water.

The corresponding N-substituted aspartic acids are obtained in an analogous manner from other polynuclear primary aromatic amines, such as alpha-naphthylamine, 2.7-aminonaphthol and beta-aminoanthraquinone.

Example 12

166 parts of monohydroxyethylaniline and 40 parts of maleic anhydride are heated for 20 hours in an oilbath at 150° C. The resulting viscous oil is heated with 200 parts of water and 94 parts of caustic soda solution of 40° Bé. strength for 16 hours while stirring at from about 90° to 100° C. After cooling, the deposited hydroxyethylaniline is separated and the sodium salt of N-phenyl-N-hydroxyethyl-aspartic acid:

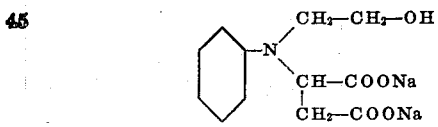

thus formed is recovered in a very good yield by evaporating the aqueous solution in vacuo. The salt forms almost colorless crystals which dissolve readily in water and slightly in methyl and ethyl alcohols. From the solutions of the salt, the free acid may be precipitated by mineral acids in the form of a viscous oil which solidifies to crystals only with difficulty and which is slightly soluble in water, toluene and ligroin and readily soluble in alcohol and glacial acetic acid.

The mixture of the initial materials may also be boiled under reflux while stirring for 20 hours in the presence of 400 parts of water or heated at 150° C. in a stirring autoclave and then saponified. The said substituted aspartic acid is also obtained in this way.

Example 13

184 parts of N-monohydroxyethyl-meta-toluidine and 40 parts of maleic anhydride are heated to 150° C. in an oilbath for about 20 hours. After cooling, the tough mass is heated with 200 parts of water and 94 parts of caustic soda solution of 40° Bé. strength at from 90° to 100° C. for from 15 to 20 hours while stirring. After cooling, the deposited N-monohydroxyethyl-meta-toluidine is separated from the aqueous solution by the addition of ether and the aqueous solution filtered with decolorizing carbon. The filtrate contains N-tolyl-N-monohydroxyethyl aspartic acid sodium salt:

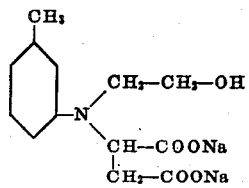

which may be recovered by evaporation. It forms almost colorless crystals which dissolve very readily in water but are soluble in alcohol only with difficulty.

The free acid may be precipitated from the aqueous solution of the salt by means of mineral acid. It is scarcely soluble in water but readily soluble in alcohol and acetone.

Example 14

1100 parts of N-monohydroxyethyl-para-cresidine:

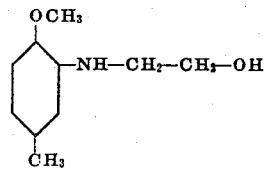

and 196 parts of maleic anhydride are heated for 20 hours at from 140° to 150° C.; the cooled mass is saponified by heating with 1000 parts of water and 470 parts of caustic soda solution of 40° Bé. strength. The deposited N-monohydroxyethyl-para-cresidine is separated and the resulting N-(2methoxy-5-tolyl) - N - hydroxyethyl - aspartic acid:

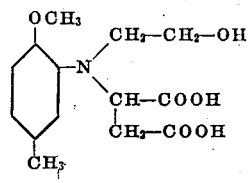

is precipitated by adding hydrochloric acid to the aqueous solution until it is slightly acid to Congo. The free acid is obtained in the form of grey crystals which are slightly soluble in cold water and readily soluble in hot water and alcohol. The crystals may be purified by recrystallization from water.

Example 15

A mixture of 1090 parts of meta-aminophenol, 500 parts of water and 500 parts of from 97 to 98 per cent maleic anhydride is stirred for 48 hours at 90° to 95° C.; after the addition of 1200 parts of caustic soda solution of 40° Bé. strength the mass is stirred for further 24 hours at the said temperature. After filtration with animal charcoal the solution is evaporated in vacuo. The solid residue is boiled twice with 3000 parts of alcohol and once with 300 parts of acetone. The compound

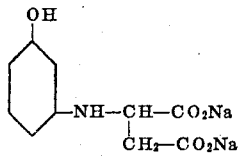

remains undissolved in the form of gray crystals readily soluble in water and difficultly soluble in alcohol and acetone.

From other aminophenols or from aminonaphthols the salts of other substituted aspartic acids may be obtained in an analogous manner.

Example 16

A mixture of 6900 parts of para-nitraniline, 10000 parts of water, 5000 parts of alcohol and 2500 parts of from 97 to 98 per cent maleic anhydride is heated for 24 hours to boiling under a reflux-cooler while stirring. After the addition of 6000 parts of caustic soda solution of 40° Bé. strength and 5000 parts of water the whole is heated for further 16 hours. After distilling off the alcohol and cooling the precipitate formed is filtered off by suction and washed with water. By acidifying the filtrate with hydrochloric acid the compound

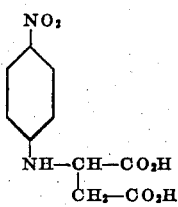

is precipitated in a very good yield. It is filtered off by suction, washed with water and dried; it forms beautiful yellow crystals difficultly soluble in cold water, soluble in hot water and alcohol and readily soluble in dilute alkali.

The reaction may be carried out in an analogous manner while starting with other nitramines, such as ortho-nitraniline, meta-nitraniline, 4- or 6-nitro-ortho-toluidine, nitronaphthylamines etc.

Example 17

750 parts of mono-methylamine, 200 parts of water and 500 parts of 97 per cent maleic anhydride are heated together for about 15 hours at about 90° C. while stirring. After the addition of 1150 parts of caustic soda solution of 40° Bé. strength the mass is stirred at the said temperature for further 20 hours. After evaporating in vacuo the aqueous solution which has been filtered with animal charcoal the residue obtained is dissolved in ethyl alcohol and rendered acid to Congo with concentrated hydrochloric acid. The sodium chloride precipitated is filtered off, the filtrate evaporated in vacuo and the residue is recrystallized from ethyl alcohol in order to remove the remaining sodium chloride. The compound

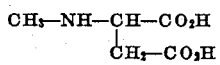

is obtained in a good yield as a yellow oil difficultly soluble in cold water, readily soluble in hot water and diluted alkali and solidifying to a crystalline mass after standing for some time.

From mono-ethyl amine N-ethyl aspartic acid is obtained in a corresponding manner. The solutions of the alkali salts of N-methyl and N-ethyl aspartic acid possess a good dispersing power; for example they prevent the precipitation of difficultly soluble metal salts.

Example 18

595 parts of finely powdered β-aminoanthraquinone, 134 parts of maleic anhydride, 1000 parts of water and 1000 parts of alcohol are heated together for 14 hours in a pressure vessel at 150° C. while stirring. 320 parts of caustic soda solution of 40° Bé. strength are added and the whole is heated in the same manner for another 14 hours. After distilling off the alcohol unconverted β-aminoanthraquinone is filtered off by suction. The liquid is filtered with animal charcoal and the compound

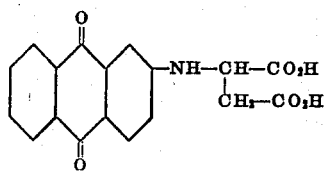

is precipitated from the filtrate by means of hydrochloric acid. It is a dyestuff difficultly soluble in water and ether, readily soluble in alcohol and diluted alkali and possesses a good affinity to wool.

Example 19

1530 parts of para-amino salicylic acid

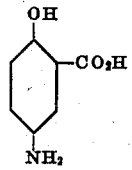

3000 parts of water and 500 parts of 98 per cent maleic anhydride are stirred together for about 15 hours in a boiling waterbath while refluxcooling. After adding 2300 parts of caustic soda solution of 40° Bé. strength the mixture is heated under the same conditions for another 24 hours. By adding hydrochloric acid to the clear solution the compound

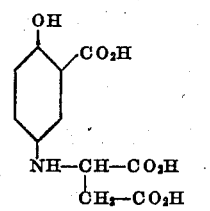

is precipitated in a good yield together with about the equimolecular amount of para-amino salicylic acid.

Example 20

1730 parts of metanilic acid are dissolved in 3000 parts of water and about 1520 parts of caustic soda solution of 40° Bé. strength, the solution obtained having a slightly alkaline reaction towards phenolphthaleine. After adding 500 parts of 98 per cent maleic anhydride the mass is heated for 18 hours on a boiling waterbath under a reflux cooler while stirring. 1200 parts of caustic soda solution of 40° Bé. strength are added and the whole is heated for another 18 hours. By the addition of hydrochloric acid to the clear solution obtained an about equimolecular mixture of metanilic acid with the compound

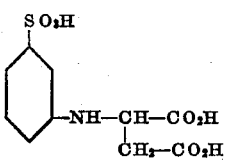

is precipitated. The said compound forms colorless crystals, difficultly soluble in ether and alcohol, somewhat better soluble in cold water and readily soluble in hot water.

Example 21

520 parts of the mixture of primary amines obtainable from the fatty acids contained in palm kernel oil according to British Patent 421,718, 125 parts of maleic anhydride, 500 parts of water and 500 parts of alcohol are heated together for 20 hours to boiling under a reflux cooler while stirring. After adding 300 parts of caustic soda solution of 40° Bé. strength heating is continued for 20 hours. After cooling the mass is precipitated with acetone and the precipitate extracted with boiling acetone. After drying a mixture of compounds corresponding to the formula

(wherein R stands for the alkyl radicals corresponding to the palm kernel oil fatty acids) is obtained as a solid colorless product readily soluble in water.

If instead of the said amine mixture 625 parts of the mixture of primary amines obtainable from partly hardened train oil, for example according to British Patent 421,718 is employed an analogous mixture of substituted aspartic acids is obtained. The alkali salts of aspartic acids substituted in this manner by high alkyl radicals are readily soluble in water; they possess a good washing, wetting and dispersing power and are softening agents for artificial silk.

What we claim is:

1. The process of producing N-substituted aspartic acid substances which comprises treating maleic acid for a long time at an elevated temperature with a member selected from the class consisting of organic compounds containing at least one group —NH$_2$ and organic compounds containing at least one group —NH— alkylol, such proportions being employed that per each molecule of maleic acid at least one group —NHX is present.

2. The process of producing N-substituted aspartic acid substances which comprises treating maleic acid for a long time at an elevated temperature with a member selected from the class consisting of organic compounds containing at least one group —NH$_2$ and organic compounds containing at least one group —NH— alkylol, such proportions being employed that per each molecule of maleic acid at least one group —NHX is present, and saponifying the resulting reaction product.

3. The process of producing N-substituted aspartic acid substances which comprises treating 1 molecular proportion of maleic acid for a long time at an elevated temperature with about 3 molecular proportions of an organic compound containing one secondary amino group substituted by at least one alkylol group.

4. The process of producing N-substituted aspartic acid substances which comprises treating maleic acid for a long time at a temperature between about 80 and about 180° C. with a member selected from the class consisting of organic compounds containing at least one group —NH$_2$ and organic compounds containing at least one group —NH— alkylol, such proportions being employed that per each molecule of maleic acid at least one group —NHX is present.

5. Mixtures of compounds each of which corresponds to the formula

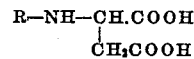

wherein R stands for the alkyl radical of the alcohols obtainable by reducing a fatty acid mixture of vegetal origin.

6. An N-substituted aspartic acid substance selected from the class consisting of free aspartic acids containing directly attached to the amino nitrogen atom at least one alkyl group with at least 12 carbon atoms and their alkali metal salts.

7. N-dodecylaspartic acid.

8. N-octodecenylaspartic acid.

WALTER REPPE.
HANNS UFER.